US006922028B2

(12) United States Patent
Akizuki

(10) Patent No.: US 6,922,028 B2
(45) Date of Patent: Jul. 26, 2005

(54) CONTROLLER FOR PERMANENT MAGNET MOTOR

(75) Inventor: Hiromitsu Akizuki, Kawasaki (JP)

(73) Assignee: Toshiba Elevator Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/472,932

(22) PCT Filed: Mar. 27, 2002

(86) PCT No.: PCT/JP02/03014
§ 371 (c)(1),
(2), (4) Date: Sep. 26, 2003

(87) PCT Pub. No.: WO02/078166
PCT Pub. Date: Oct. 3, 2002

(65) Prior Publication Data
US 2004/0104710 A1 Jun. 3, 2004

(30) Foreign Application Priority Data
Mar. 27, 2001 (JP) ......................... 2001-090899

(51) Int. Cl.$^7$ ................................. H02P 6/16
(52) U.S. Cl. ................. 318/254; 318/138; 318/439; 318/700; 318/723; 318/721
(58) Field of Search ................. 318/254, 138, 318/439, 700, 723, 721, 701

(56) References Cited

U.S. PATENT DOCUMENTS

| 4,384,242 | A | * | 5/1983 | Ono ........................... 318/721 |
| 4,734,633 | A | * | 3/1988 | Ono et al. .................. 318/723 |
| 4,952,860 | A | * | 8/1990 | Soeda ........................ 318/721 |
| 5,378,976 | A | * | 1/1995 | Inaji et al. ................. 318/810 |
| 5,565,752 | A | * | 10/1996 | Jansen et al. ............... 318/807 |
| 5,796,228 | A | * | 8/1998 | Kojima et al. .............. 318/605 |
| 5,854,548 | A | * | 12/1998 | Taga et al. .................. 318/721 |
| 6,462,491 | B1 | * | 10/2002 | Iijima et al. ................ 318/254 |
| 6,674,261 | B2 | * | 1/2004 | Takahashi et al. .......... 318/721 |

FOREIGN PATENT DOCUMENTS

| JP | 62-268366 | | 11/1987 | |
| JP | 4-193092 | | 7/1992 | |
| JP | 7-337078 | | 12/1995 | |
| JP | 7337078 | * | 12/1995 | |
| JP | 07337078 | A * | 12/1995 | ............. H02P/6/16 |
| JP | 8-122096 | | 5/1996 | |

* cited by examiner

Primary Examiner—Rita Leykin
(74) Attorney, Agent, or Firm—Oblon, Spivak, McClelland, Maier & Neustadt, P.C.

(57) ABSTRACT

Disclosed is a control device of a permanent magnet electric motor which makes it possible to synchronously control the permanent magnet electric motor even when the magnetic pole logarithm of the permanent magnet electric motor is not an integral multiple of the number of repeats of a rotation phase signal during one rotation.

The control device creates a magnetic pole phase signal based on a rotation phase signal, obtained by detecting the rotation of an output axis of the permanent magnet electric motor, and synchronously controls the permanent magnet electric motor in compliance with the magnetic pole phase signal; the control device comprises a first signal conversion unit which converts the rotation phase signal to a rotation angle signal which is proportional to the rotation angle each time a rotor of the permanent magnet electric motor rotates once, and a second signal conversion unit which converts the rotation angle signal to the magnetic pole phase signal, repeated a number of times equal to a magnetic pole logarithm of the permanent magnet electric motor.

9 Claims, 11 Drawing Sheets

CONTROLLER FOR PERMANENT MAGNET MOTOR

BACKGROUND OF THE INVENTION

1. Field of the Invention

The present invention relates to a control device of a permanent magnet synchronous electric motor (hereinafter referred to simply as "permanent magnet motor"), which creates a magnetic pole phase signal of a rotor based on a rotation phase signal, obtained by detecting the rotation of the output axis of the permanent magnet motor, and synchronously controls the permanent magnet motor in compliance with the magnetic pole phase signal.

2. Description of the Related Art

FIG. 7 is a block diagram showing the constitution of a control device of a permanent magnet motor which drives, for example, an elevator. In FIG. 7, a rotation position detector 2 is connected to an electric motor 1. The rotation position detector 2 detects the rotation position of the electric motor 1, and outputs, for example, a rotation phase signal φh permanent magnet motor having a number of signal repeats of two during one rotation of the motor, the rotation phase signal φ being applied to a magnetic pole phase converter 3. The magnetic pole phase converter 3 converts the rotation phase signal φ to a magnetic pole phase signal θ having a rotation number corresponding to the magnetic pole logarithm, and applies this to an electric motor controller 4. The electric motor controller 4 controls the current of a stator so that it generates a magnetic field in synchronism with the magnetic pole phase signal.

In this case, the magnetic pole phase converter 3 uses the value obtained by dividing the magnetic pole logarithm of the electric motor 1 by the number of signal repeats in one rotation of the rotation position detector 2 as a conversion coefficient, multiplies the rotation phase signal φ by the conversion coefficient, and creates the magnetic pole phase signal θ by taking the remainder after dividing the obtained signal by the rotation angle for one rotation (e.g. 360 degrees). By this method, the electric motor 1 is synchronously controlled.

However, in the conventional method for creating the magnetic pole phase signal described above, unless the magnetic pole logarithm of the electric motor 1 is an integral multiple of the number of repeats of the signal output from the rotation position detector 2, the position of the magnetic pole cannot be detected accurately and it becomes impossible to control the synchrony. This point will be explained using FIGS. 8 and 9.

For example, when the magnetic pole logarithm of the electric motor 1 is four and the number of repeats of the rotation phase signal output by the rotation position detector 2 during one rotation of the electric motor 1 is two, the value of the rotation phase signal φ of the rotation position detector 2 changes in a saw-tooth shape twice during one actual rotation of the motor, as shown in FIG. 8A. In contrast, when the magnetic pole logarithm of the electric motor 1 is four, the magnetic pole phase signal changes in a saw-tooth shape four times during one actual rotation of the motor, as shown in FIG. 8B. Since the number of repeats of the rotation phase signal φ is two and the magnetic pole logarithm is four, the magnetic pole phase converter 3 multiplies the rotation phase signal φ by a conversion coefficient of 4/2=2, and outputs the remainder obtained by sequentially dividing by 360 degrees, i.e. a magnetic pole phase signal increasing from zero degrees to 360 degrees four times during one rotation of the motor. Consequently, the signal shown in FIG. 8B is obtained, enabling the system shown in FIG. 7 to control the synchrony of the electric motor 1.

On the other hand, when the magnetic pole logarithm of the electric motor 1 is three and the number of repeats of the rotation phase signal output by the rotation position detector 2 during one rotation of the electric motor 1 is two, the value of the rotation phase signal φ of the rotation position detector 2 changes in a saw-tooth shape twice, as shown in FIG. 9A. When the magnetic pole phase converter 3 divides the magnetic pole logarithm (three) by the number of signal repeats of the rotation position detector 2 (two), the conversion coefficient becomes 3/2. When the magnetic pole phase converter 3 multiplies this conversion coefficient of 3/2 by the value of the rotation position detection phase, and outputs the value of the remainder obtained by subtracting 360 degrees as the magnetic pole phase signal, as shown in FIG. 9B, the magnetic pole phase becomes discontinuous, rising from zero degrees to 360 degrees as the angle of rotation of the motor increases from zero degrees to 120 degrees, rising from zero degrees to 180 degrees as the angle of rotation of the motor increases from 120 degrees to 180 degrees, and then repeating the same change as the angle of rotation of the motor increases from 180 degrees to 360 degrees. For this reason, the system shown in FIG. 7 is incapable of controlling the electric motor 1 in synchronism with the magnetic pole logarithm.

SUMMARY OF THE INVENTION

The present invention has been realized in order to solve the problems described above, and it is a first object of this invention to provide a control device of a permanent magnet electric motor which makes it possible to synchronously control the permanent magnet electric motor even when the magnetic pole logarithm of the permanent magnet electric motor is not an integral multiple of the number of repeats of a rotation phase signal during one rotation.

It is a second object of this invention to provide the control device of a permanent magnet electric motor which, even when the power supply to the control device is cut off, can reliably restore the rotation angle signal and the magnetic pole phase signal to their values prior to the power cut.

Subsequently, after explaining the principles of the invention, means for solving the above problems will be described. When the magnetic pole logarithm of the permanent magnet electric motor is not an integral multiple of the number of repeats of a rotation phase signal during one rotation, synchronous control becomes problematic, since the phase is discontinuous. Accordingly, this can be solved by making the rotation phase signal φ detected by the rotation position detector 2 temporarily proportional to the rotation angle in one rotation of the electric motor, converting it to a signal having one repeat, and then converting this converted signal to a signal equivalent to the magnetic pole logarithm.

For example, let us suppose that when the magnetic pole logarithm of the electric motor 1 is three, and the number of repeats of the rotation phase signal detected by the rotation position detector 2 during one rotation of the electric motor 1 is two. At this time, the rotation phase signal φ shown in FIG. 10A is output from the rotation position detector 2. When the value of the rotation phase signal φ is divided by the number of repeats (two) in one rotation of the electric motor, as shown by the solid line of FIG. 10B, the obtained rotation angle signal increases linearly between the motor rotation angles of zero degrees and 180 degrees, and, as shown by the broken line, the obtained rotation angle signal increases linearly between the motor rotation angles of 180 degrees and 360 degrees. Therefore, by adding a value of 180 degrees between the motor rotation angles of 180 degrees and 360 degrees (i.e. by increasing the figure), a rotation angle signal φ', which increases linearly with respect to the rotation angle Φ of one rotation of the electric motor, can be obtained. By multiplying the magnetic flux logarithm by the rotation angle signal φ' and dividing the obtained value by the rotation angle of one rotation (e.g. 360 degrees) and taking the remainder, the magnetic pole phase signal θ having a repeat number of three in one rotation of the motor can be obtained, as shown in FIG. 10C.

There is a problem here that, when the power supply to the control device fails, the figure-increase information at the time of creating the rotation angle signal φ' must be saved until the power is restored. As shown in FIG. 11A, with a combination of the magnetic pole logarithm of the permanent magnet electric motor of three and two repeats of the rotation phase signal during one rotation of the electric motor, when the power is cut off at, for example, point a0, and resumed at a point b0 exactly 180 degrees from the point a0, if the figure-increase information at the time of creating the rotation angle signal φ' when power is resumed is lost, the signal will be converted to one with a rotation angle different to the actual one and deviating by 180 degrees, such as b1' in FIG. 11B; in the rotation angle signal φ' thereby obtained, a1 corresponding to a0 becomes equal to b1 corresponding to b0, and as a result, as shown in FIG. 11C, the value for b2 which should have been greater than the value a2 in the magnetic pole phase signal θ becomes equal to the value of a2.

With regard to this problem, the figure-increase information of the rotation angle signal φ' can be stored constantly in a nonvolatile memory device, and, when power is restored, the accurate magnetic pole phase signal θ can be detected by creating a rotation angle signal in which is the same as that prior to the power failure. Another solution is to constantly store the magnetic pole phase signal θ in the nonvolatile memory device, and, when power is restored, determine whether the deviation with the magnetic pole phase signal θ immediately prior to the power failure exceeds a fixed value, and correct the magnetic pole phase signal θ accordingly.

However, these solutions are limited to a case where the electric motor does not rotate during the power failure; when the motor rotates due to external torque during power failure, it becomes meaningless to store the figure-increase information of the rotation angle signal φ. As shown in FIGS. 12 and 12B, in such a case, to avoid mistaken detection of the magnetic pole phase, when the frequency of the rotation position detection device in one rotation of the motor is, for example, two, the response of a step current to the present magnetic pole phase signal $\phi_0$ is measured, and the response of the step current to the next phase ($\theta_0+180$ degrees) is measured, and it is determined by comparing the responses whether the magnetic pole phase needs to be corrected. By using the fact that when current is injected in a phase in the regular direction, the magnetic field of the permanent magnetic of the electric motor increases the speed of the step response, but when current is injected in a phase in the reverse direction, the step response slows down, it can be determined that no correction is necessary when the response of the $\theta_0$ phase is faster, and that correction is needed when the response of the ($\theta_0+180$ degrees) phase is faster.

When the determination by magnetic pole phase compensation is not correctly executed, so that the magnetic pole phase is not accurately identified, the repulsive force of the magnetic pole may rotate the motor at an excessive speed; alternatively, when the motor does not rotate, the control device may generate excessive current and voltage. Consequently, when any one of excessive speed, excessive current, and excessive voltage have been detected at the first start-up of the electric motor after power has been restored following power failure, the control device must be immediately stopped, and the magnetic pole phase corrected at the same time.

According to a first aspect of this invention, a control device of a permanent magnet electric motor creates a magnetic pole phase signal based on a rotation phase signal, obtained by detecting the rotation of an output axis of the permanent magnet electric motor, and synchronously controls the permanent magnet electric motor in compliance with the magnetic pole phase signal, the control device comprising a first signal conversion unit which converts the rotation phase signal to a rotation angle signal which is proportional to the rotation angle each time a rotor of the permanent magnet electric motor rotates once; and a second signal conversion unit which converts the rotation angle signal to the magnetic pole phase signal, repeated a number of times equal to a magnetic pole logarithm of the permanent magnet electric motor.

According to a second aspect of this invention, in the control device of the permanent magnet electric motor of the first aspect, the first signal conversion unit comprises a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; a rotation angle signal memory unit comprising a nonvolatile memory device which constantly stores and updates the output signal of the rotation angle conversion unit in the nonvolatile memory device; and a rotation angle correction unit which, based on the stored value of the rotation angle memory unit, determines a state where the rotation angle signal is different when the power supply to the control device and when the power is restored, creates the rotation angle correction signal and corrects the output of the rotation angle conversion unit, so as to make the rotation angle signal the same when the power supply to the control device and when the power is restored.

According to a third aspect of this invention, in the control device of the permanent magnet electric motor of the first aspect, the second signal conversion unit comprises a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal; a magnetic pole phase memory unit comprising a nonvolatile memory device which constantly stores and updates the output signal of the magnetic pole phase conversion unit in the nonvolatile memory device; and a magnetic pole phase correction unit which, based on the stored value of the magnetic pole phase memory unit, determines a state where the magnetic pole phase signal is different when the power supply to the control device and when the power is restored, creates the magnetic pole phase correction signal and corrects the output of the magnetic pole phase conversion unit, so as to make the magnetic pole phase signal the same when the power supply to the control device and when the power is restored.

According to a fourth aspect of this invention, the control device of the permanent magnet electric motor of the first aspect further comprises a magnetic pole determination control unit which determines whether the rotation angle signal should be corrected by measuring a current step response of the permanent magnet electric motor, such as changing phase and creating a magnetic field; the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; and a rotation angle correction unit which, when the magnetic pole determination control unit has determined that the rotation angle signal should be corrected, creates the rotation angle correction signal and corrects the output of the rotation angle conversion unit, so as to make the rotation angle signal the same when the power supply to the control device and when the power is restored.

According to a fifth aspect of this invention, the control device of the permanent magnet electric motor of the first aspect further comprises a magnetic pole determination control unit which determines whether the rotation angle signal should be corrected by measuring a current step response of the permanent magnet electric motor, such as changing phase and creating a magnetic field; the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal; a magnetic pole phase correction unit which, when the magnetic pole determination control unit has determined that the magnetic pole phase signal should be corrected, creates the magnetic pole phase correction signal and corrects the output of the magnetic pole phase conversion unit, so as to make the magnetic pole phase signal the same when the power supply to the control device and when the power is restored.

According to a sixth aspect of this invention, the control device of the permanent magnet electric motor of the first aspect further comprises a detecting unit which detects speed changes of the permanent magnet electric motor; and an electric motor control abnormality detecting unit which outputs a command to inject step current when the supply power to the control device is restored after failure, and determines whether the rotation angle signal should be corrected when the supply power to the control device is restored after failure, based on the detection result of the detecting unit; the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; and a rotation angle correction unit which, when the electric motor control abnormality detecting unit has output a rotation angle correction command, creates the rotation angle correction signal and corrects the output of the rotation angle conversion unit, so as to make the rotation angle signal the same when the power supply to the control device and when the power is restored.

According to a seventh aspect of this invention, the control device of the permanent magnet electric motor of the first aspect further comprises a detecting unit which detects speed changes of the permanent magnet electric motor; and an electric motor control abnormality detecting unit which outputs a command to inject step current when the supply power to the control device is restored after failure, and determines whether the magnetic pole phase signal should be corrected when the supply power to the control device is restored after failure, based on the detection result of the detecting unit; the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic; pole phase signal; a magnetic pole phase correction unit which, when the electric motor control abnormality detecting unit has determined that the magnetic pole phase signal should be corrected, creates the magnetic pole phase correction signal and corrects the output of the magnetic pole phase conversion unit so as to make the magnetic pole phase signal the same when the power supply to the control device and when the power is restored.

According to an eighth aspect of this invention, the control device of the permanent magnet electric motor of the first aspect further comprises a detecting unit which detects either the current or the voltage of the permanent magnet electric motor; an electric motor control abnormality detecting unit which, after the power supply to the control device has been resumed after failure, detects a control abnormality of the electric motor based on the detection result of the detecting unit, and outputs an electrical control stop command and a rotation angle correction command; the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; and a rotation angle correction unit which, when the electric motor control abnormality detecting unit has output a rotation angle correction command, creates the rotation angle correction signal and corrects the output of the rotation angle conversion unit, so as to make the rotation angle signal the same when the power supply to the control device and when the power is restored.

According to a ninth aspect of this invention, the control device of the permanent magnet electric motor of the first aspect further comprises a detecting unit which detects either the current or the voltage of the permanent magnet electric motor; an electric motor control abnormality detecting unit which, after the power supply to the control device has been resumed after failure, detects a control abnormality of the electric motor based on the detection result of the detecting unit, and outputs an electrical control stop command and a rotation angle correction command; the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal; a magnetic pole phase correction unit which, when the electric motor control abnormality detecting unit has output a magnetic pole phase signal correction command, creates the magnetic pole phase correction signal and corrects the output of the magnetic pole phase conversion unit, so as to make the magnetic pole phase signal the same when the power supply to the control device and when the power is restored.

DESCRIPTION OF THE PREFERRED EMBODIMENTS

Preferred embodiments of the present invention will be explained based on the drawings.

Figure 1:
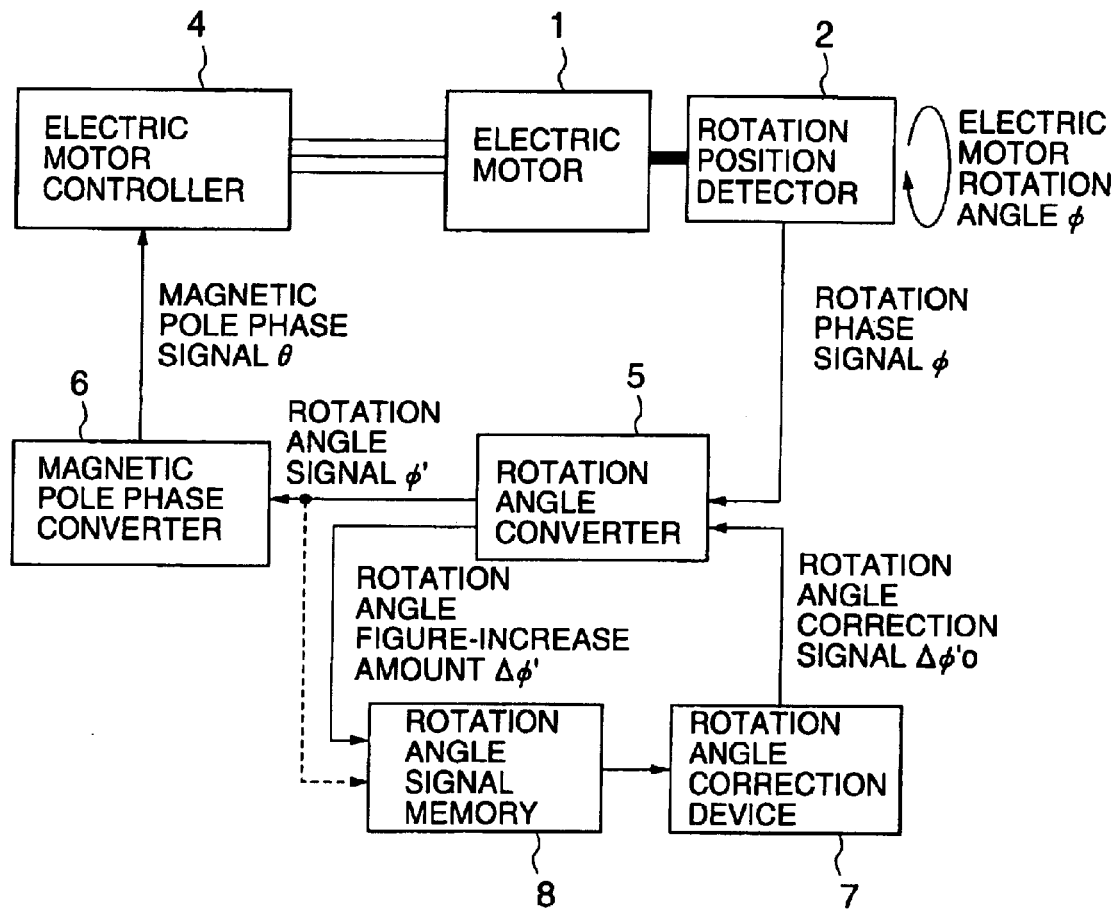
FIG. 1 is a block line diagram showing the constitution of a control device of a permanent magnet electric motor according to a first embodiment of this invention.
Figure 7:
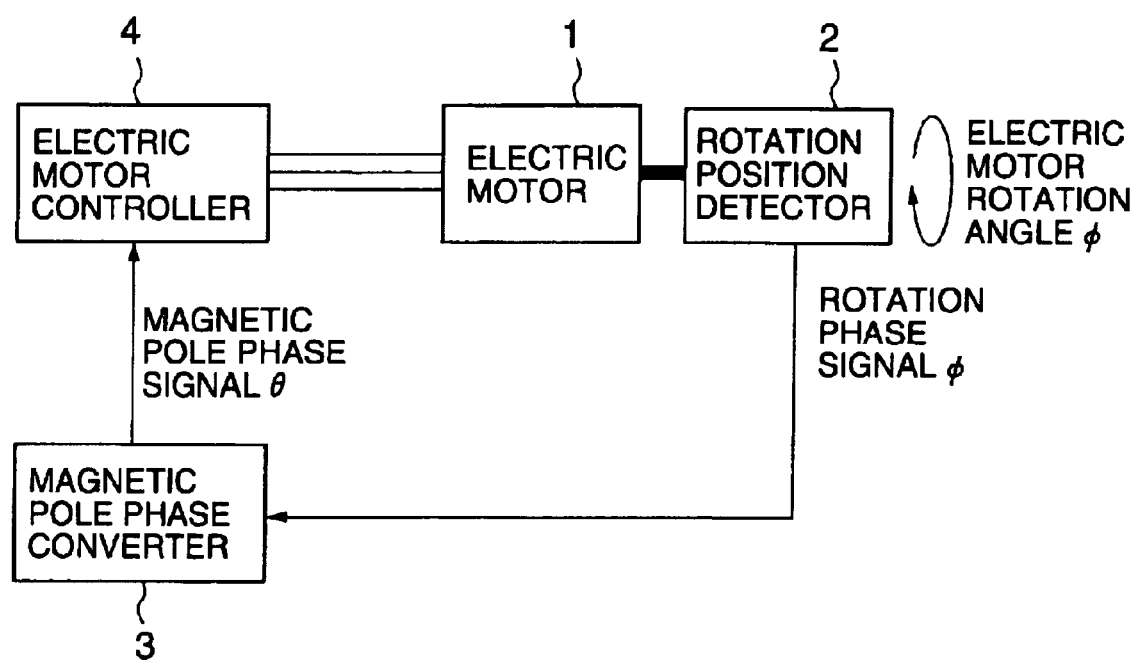
FIG. 7 is a block line diagram showing the constitution of a conventional control device of a permanent magnet electric motor.
Figure 8:
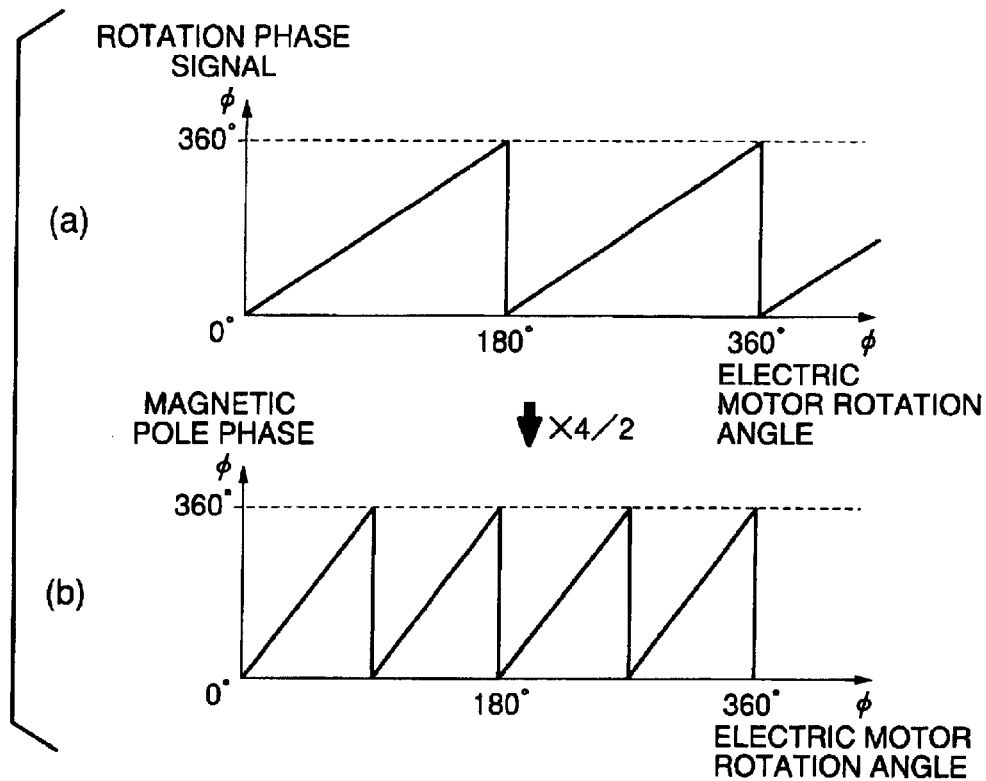
FIG. 8 is a line diagram showing the relationship between the rotation angle of a motor, a rotation phase signal, and a magnetic pole phase signal, in order to describe the operation of the conventional control device of the permanent magnet electric motor shown in FIG. 7.
Figure 9:
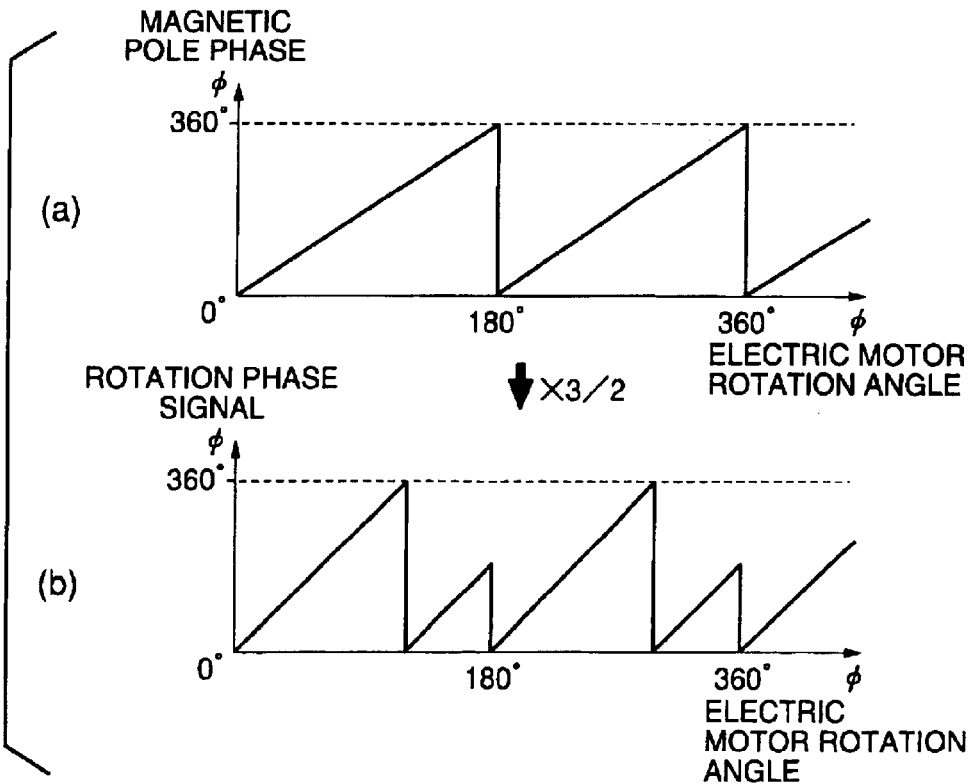
FIG. 9 is a line diagram showing the relationship between the rotation angle of a motor, a rotation phase signal, and a magnetic pole phase signal, in order to describe the operation of the conventional control device of the permanent magnet electric motor shown in FIG. 7.
Figure 10:
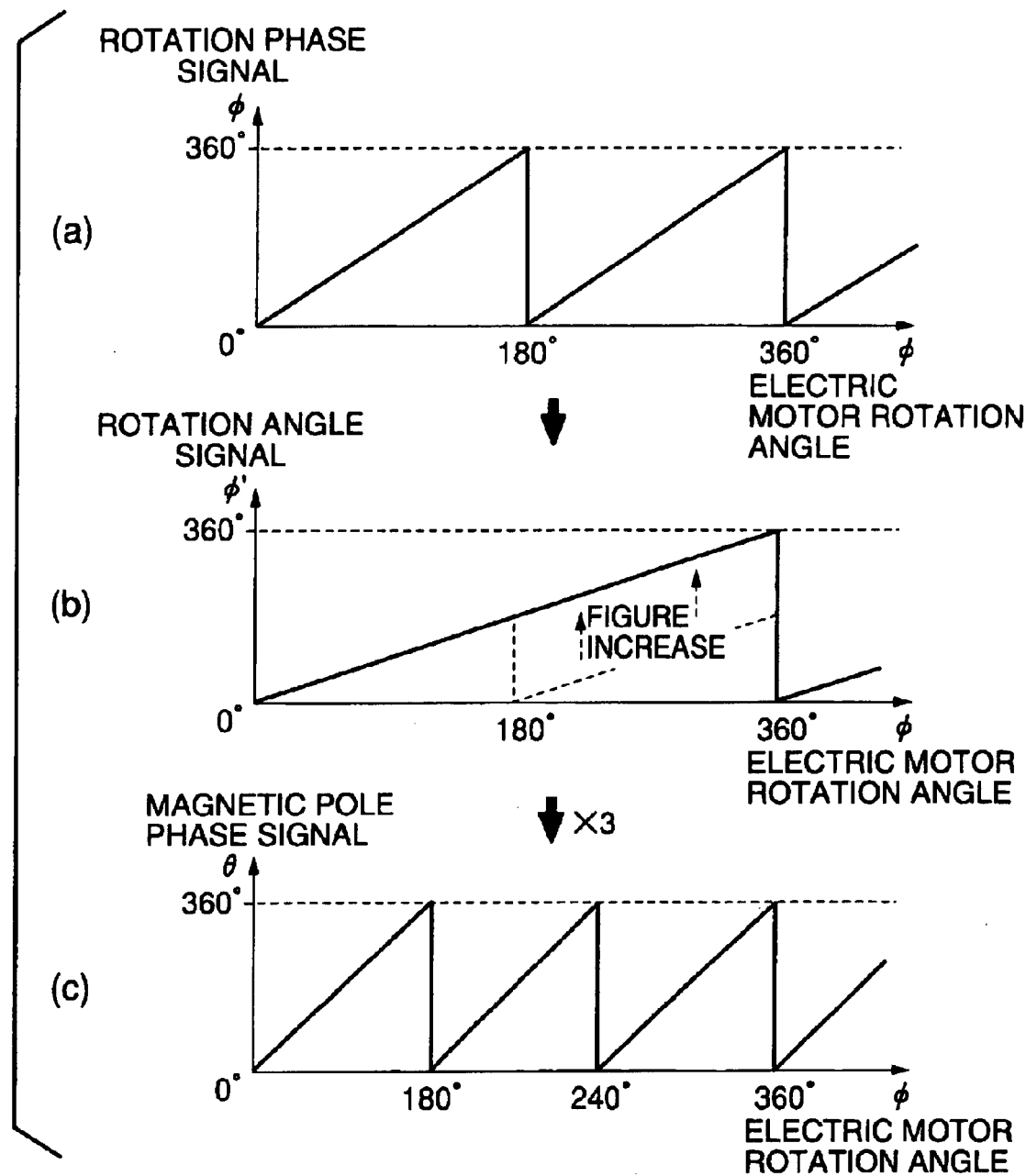
FIGS. 10A, 10B, and 10C are line diagrams showing the relationship between the rotation angle of a motor, a rotation phase signal, a rotation angle signal, and a magnetic pole phase signal, in order to explain the principles of the present invention.
Figure 11:
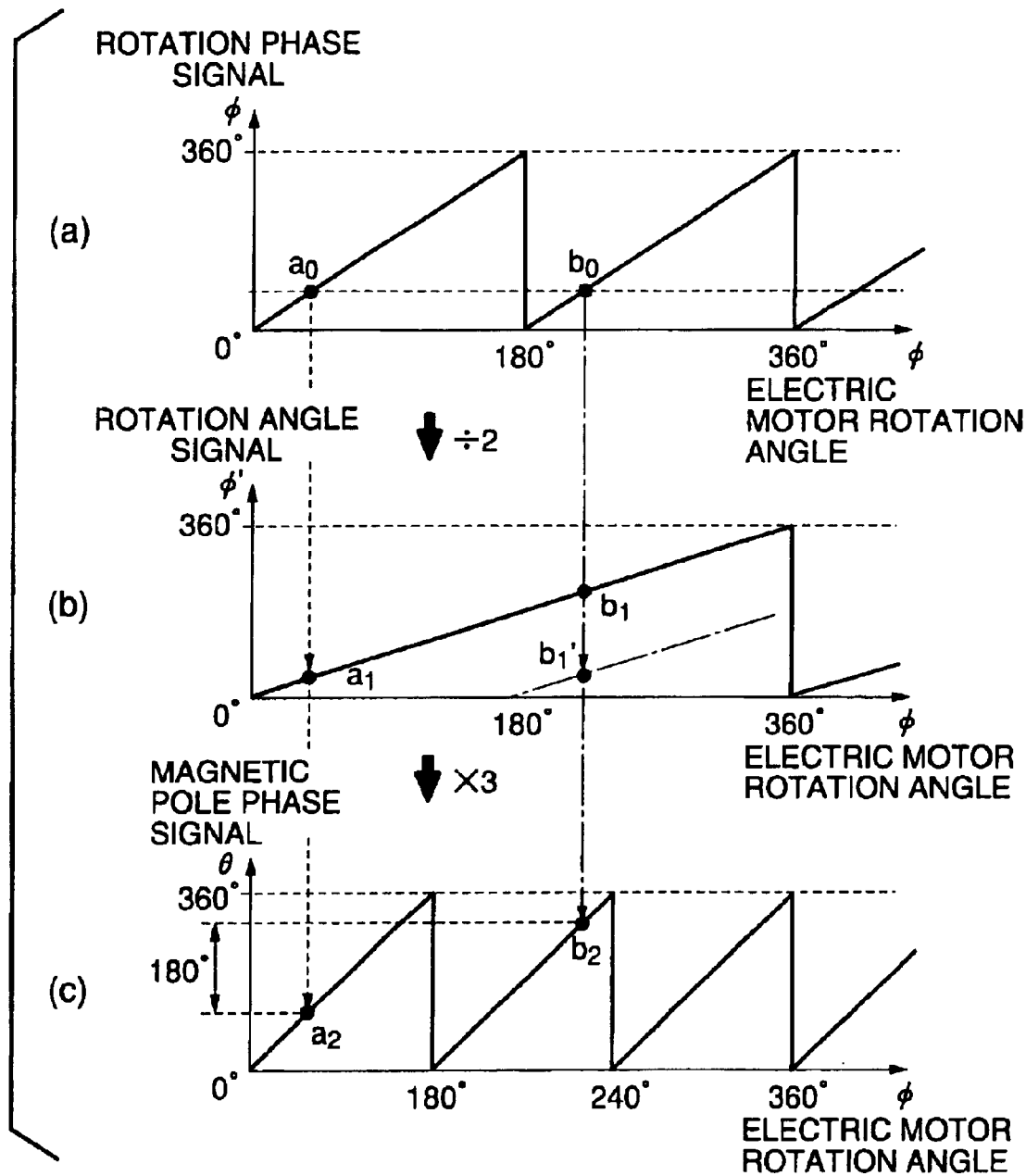
FIGS. 11A, 11B, and 11C are line diagrams showing the relationship between the rotation angle of a motor, a rotation phase signal, a rotation angle signal, and a magnetic pole phase signal, in order to explain the principles of the present invention.

FIG. 1 is a block line diagram showing the constitution of a control device of a permanent magnet electric motor according to this invention; the same reference codes as those in FIG. 7 represent the same elements. In FIG. 1, a rotation position detector 2 is connected to a electric motor 1, and the rotation phase signal $\phi$ obtained by the rotation position detector 2 is converted to a rotation angle signal $\phi'$ by a rotation angle converter 5, which connects to a rotation angle signal memory 8 and a rotation angle correction device 7; after a magnetic pole phase converter 6 has converted the signal to a magnetic pole phase signal $\theta$, it is incorporated into an electric motor controller 4 which drives the electric motor 1.

The rotation angle signal memory 8 constantly stores and updates the rotation angle signal $\phi'$ and rotation angle figure amount $\Delta\phi'$, and is a nonvolatile memory which, in the event of a power failure, stores the immediately preceding value; the rotation angle correction device 7 corrects the signal output from the rotation angle converter 5 in compliance with the memory status of the rotation angle signal memory 8.

Subsequently, the operation of the first embodiment will be explained. The rotation position detector 2 outputs a phase signal $\phi$ which has a number of repeats n during one rotation of the electric motor 1, that is, a phase signal $\phi$ having a number of repeats per number of rotations of the motor of n·$\Phi$. The number of repeats n of the rotation phase signal $\phi$ during one rotation of the electric motor 1 is determined according to the signal output format of the rotation position detector 2 itself, and the connection status of the rotating axis and output axis of the electric motor 1, (i.e. whether the rotating axis and the output axis are directly coupled, or whether a pulley for acceleration and deceleration is provided between them, and the like).

The rotation angle converter 5 converts the rotation phase signal $\phi$ to a rotation angle signal $\phi'$ which becomes a phase signal of 360 degrees for one rotation, like the motor rotation angle $\Phi$. Since the relationship between the motor rotation angle $\Phi$ and the rotation phase signal $\phi$ is $\phi$=n·$\Phi$, the conversion is calculated by determining the rotation angle signal beforehand as $\phi'$=$\phi$/n, and increasing the figure of the signal segment after the rotation angle signal $\phi'$ has reached a predetermined size to $\Delta\phi'$, so that the rotation angle signal $\phi'$ increases to 360 degrees during one rotation.

The rotation angle signal $\phi'$ is supplied to the magnetic pole phase converter 6, where it is converted to a magnetic pole phase signal $\theta$ at the same frequency as the magnetic pole m in one rotation of the electric motor 1 and is then supplied to the electric motor controller 4. In this case, $\theta$=m·$\phi'$ is calculated, and the surplus obtained after subtracting the 360 degrees is determined, so that the rotation angle signal $\phi'$ is converted to a magnetic pole phase signal having m repeats in one rotation.

In this embodiment, even when the power supplied to the control device is cut off, the figure amount $\Delta\phi'$ until the power is subsequently restored is stored and saved in the rotation angle signal memory 8 comprising a nonvolatile memory device; when the power is restored, the rotation angle correction device 7 determines whether the figure amount $\Delta\phi'$ is saved in the rotation angle signal memory 8, and, when the figure amount $\Delta\phi'$ is saved, the rotation angle correction device 7 creates a figure amount $\Delta\phi'$0, which is supplied to the rotation angle converter 5 as the initial value for the figure amount.

As shown by the broken line in FIG. 1, the rotation angle signal $\phi'$ is constantly stored in the rotation angle signal memory 8 and updated, enabling the rotation angle correction device 7 to compare the value at the time of power cutoff with the value at the time of power resumption, and determine the rotation angle correction signal $\Delta\phi'$ 0.

According to the first embodiment, the rotation phase signal is converted to a rotation angle signal which is proportional to the rotation in each rotation of the rotor of the permanent magnet electric motor, and the rotation angle signal is converted to a magnetic pole phase signal which has a number of repeats equal to the magnetic pole logarithm of the permanent magnet electric motor; therefore, the magnetic pole logarithm of the permanent magnet electric motor can be synchronously controlled even when the magnetic pole logarithm of the permanent magnet electric motor is not an integral multiple of the number of repeats of the rotation phase signal during one rotation.

Furthermore, even when the power supply to the control device is cut off, the figure amount $\Delta\phi'$ is stored and saved until the power is subsequently restored, and the rotation angle signal $\phi'$ is corrected in accordance with the figure amount $\Delta\phi'0$; therefore, even during power failure, the rotation angle signal $\phi'$ can be reliably restored to its value prior to the power failure.

Figure 2:
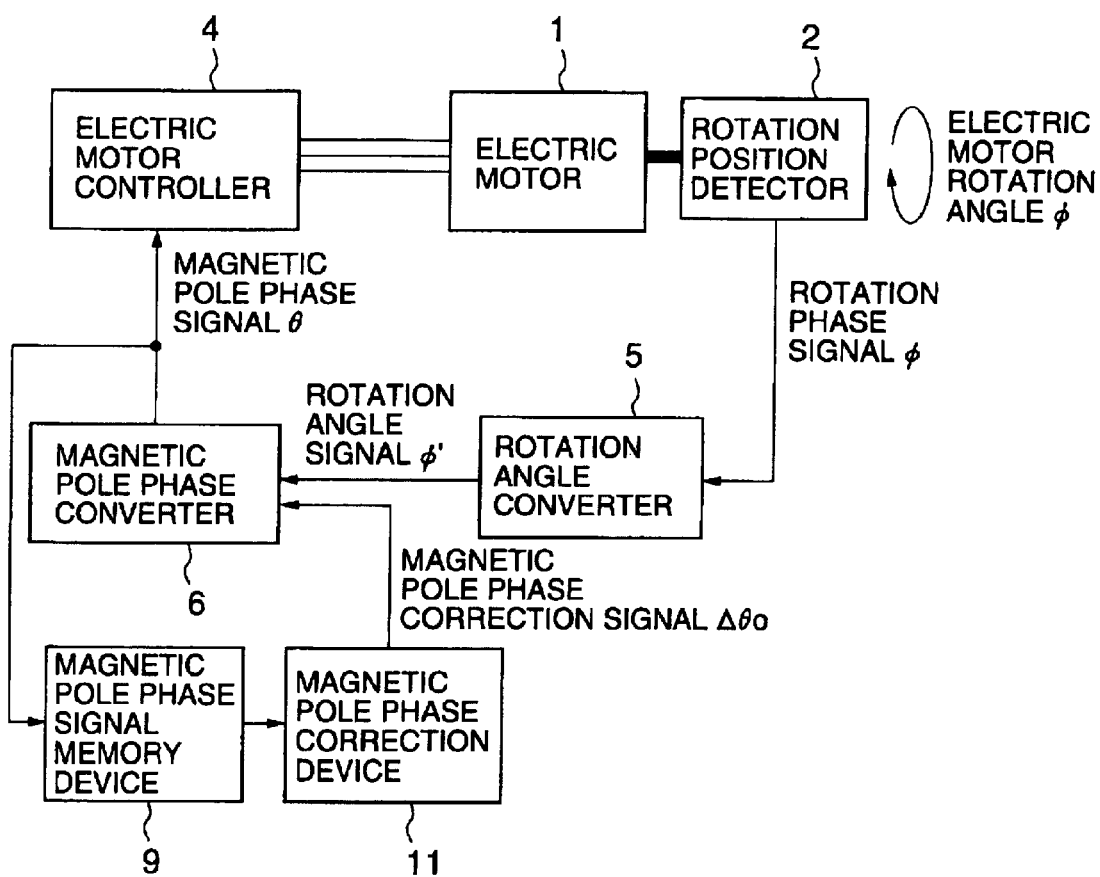
FIG. 2 is a block line diagram showing the constitution of a control device of a permanent magnet electric motor according to a second embodiment of this invention.

FIG. 2 is a block line diagram showing the constitution of a control device of a permanent magnet electric motor according to a second embodiment of this invention; the same reference codes as those in FIG. 1 represent the same elements, and further explanation of these will be omitted.

The second embodiment comprises a magnetic pole phase signal memory device 9 being a nonvolatile memory device which, when the power supply to the electric motor controller 4 is cut off, stores the value of the magnetic pole phase signal $\theta$ of the magnetic pole phase converter 6 at the time of the power-cut, and saves the stored value until the power is subsequently restored, and a magnetic pole phase correction device 11 which, when the power supply is restored, compared the magnetic pole phase signal stored in the magnetic pole phase signal memory device 9 with the magnetic pole phase signal at the time of power restoration, and determines a correction amount $\Delta\theta 0$ which will make the present magnetic pole phase the same as the phase prior to power failure, and uses this as the initial value of the magnetic pole phase converter 6 when power is restored.

According to the second embodiment shown in FIG. 2, the magnetic pole logarithm of the permanent magnet electric motor can be synchronously controlled even when the magnetic pole logarithm of the permanent magnet electric motor is not an integral multiple of the number of repeats of the rotation phase signal during one rotation; in addition, even when the power supply to the control device is cut off, the magnetic pole phase signal can be reliably restored to its value prior to the power cut.

Figure 3:
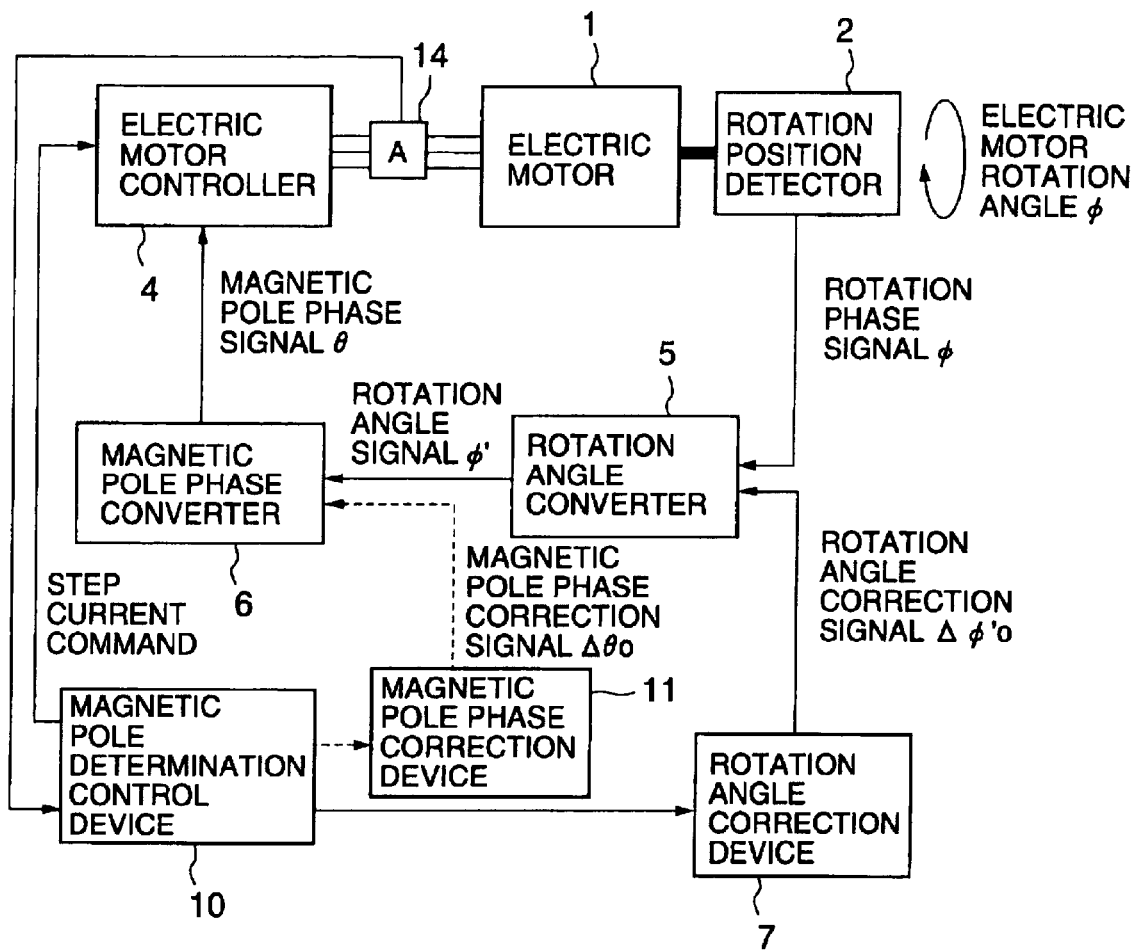
FIG. 3 is a block line diagram showing the constitution of a control device of a permanent magnet electric motor according to a third embodiment of this invention.

FIG. 3 is a block line diagram showing the constitution of a control device of a permanent magnet electric motor according to a third embodiment of this invention; the same reference codes as those in FIG. 1 represent the same elements, and further explanation of these will be omitted.

In the third embodiment, a magnetic pole determination control device 10 is provided instead of the rotation angle signal memory 8 shown in FIG. 1, and the rotation angle correction device 7 corrects the rotation angle signal $\phi'$ output by the rotation angle converter 5 based on the determination result of the magnetic pole determination control device 10.

Figure 12:
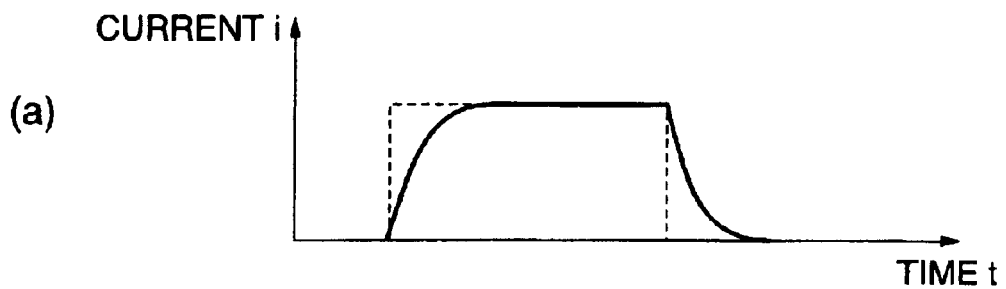
FIGS. 12A and 12B are waveform diagrams showing the difference in step response at different magnetic pole phases in order to explain the principles of the present invention.
Figure 12:
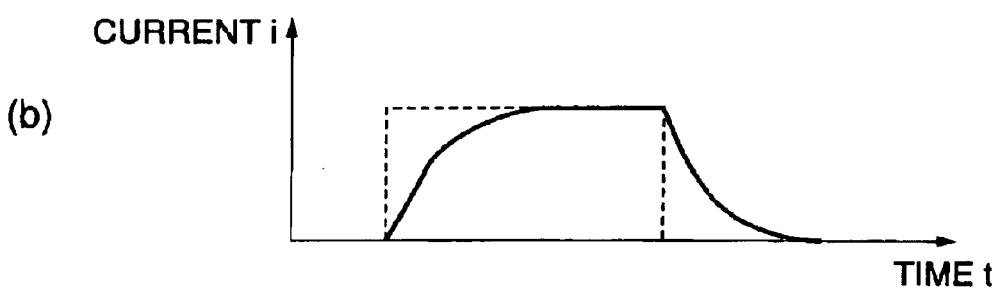

When power is restored, the magnetic pole determination control device 10 extracts the output signal of a current detector 14, which detects the current of the electric motor, and, as shown in FIGS. 12A and 12B, measures the response of a step current to the current magnetic pole phase signal $\theta 0$, measures the response of a step current to a phase of ($\theta 0$+180 degrees), and compares the two responses so as to determine whether the magnetic pole phase needs to be corrected. That is, when the number of repeats of the rotation phase signal output by the rotation position detector 2 during one rotation of the electric motor 1 is two and the permanent magnetic flux logarithm is three, the rotation angle signal $\phi'$ deviates by 180 degrees. At this time, the magnetic pole phase signal $\theta$ output from the magnetic pole phase converter 6 is also different.

Accordingly, when the response of the magnetic pole phase signal $\theta$ is rapid due to the injection of current in the regular direction (phase $\theta$) in compliance with a step current command, no correction is necessary, and therefore, it is determined that there is no need to correct the output status of the rotation angle signal $\phi'$. When the response of the magnetic pole phase signal $\theta$ is rapid due to the injection of current in the reverse direction (phase $\theta$+180 degrees) in compliance with a step current command, correction is necessary, and therefore, it is determined that the output status of the rotation angle signal $\phi'$ must be corrected. The rotation angle correction device 7 makes this determination, and, when correction is necessary, corrects the rotation angle signal $\phi'$ by using the rotation angle correction signal $\Delta\phi'$.

The above explanation describes a case where the rotation angle signal $\phi'$ is corrected based on the response of the step current, but, as explained using FIG. 2, the magnetic pole phase signal $\theta$ may be corrected similarly. When correcting the magnetic pole phase signal $\theta$, the magnetic pole phase correction device 11 is provided, and the magnetic pole phase signal $\theta$ output from the magnetic pole phase converter 6 is corrected by the magnetic pole correction signal $\Delta\phi 0$, as shown by the path of broken lines in FIG. 3, According to the third embodiment shown in FIG. 3, the magnetic pole logarithm of the permanent magnet electric motor can be synchronously controlled even when the magnetic pole logarithm of the permanent magnet electric motor is not an integral multiple of the number of repeats of the rotation phase signal during one rotation; in addition, even when the power supply to the control device is cut off, the rotation angle signal and the magnetic pole phase signal can be reliably restored to their values prior to the power cut.

Figure 4:
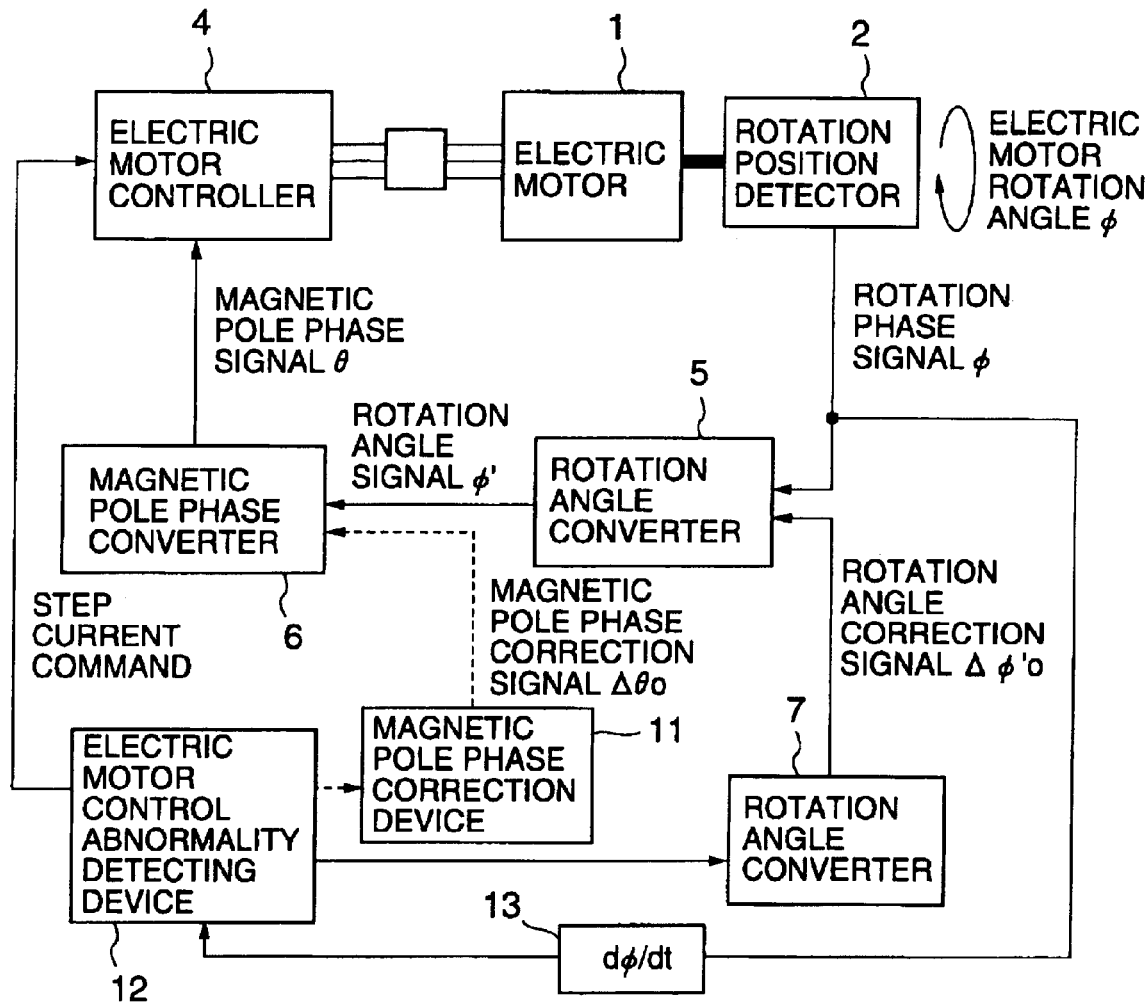
FIG. 4 is a block line diagram showing the constitution of a control device of a permanent magnet electric motor according to a fourth embodiment of this invention.

FIG. 4 is a block line diagram showing the constitution of a control device of a permanent magnet electric motor according to a fourth embodiment of this invention; the same reference codes as those in FIG. 3 represent the same elements, and further explanation of these will be omitted. In the first to third embodiments described above, when the rotation angle signal and magnetic pole phase signal are not accurately corrected at the time of power failure and power restoration, causing the magnetic pole phase to be mistakenly identified, the electric motor 1 will be driven at an abnormal speed which deviates greatly from the speed command value of the electric motor controller 4. In this case, the electric motor controller 4 is stopped immediately, and a correction command is transmitted to the rotation angle correction device 7 and the magnetic pole phase correction device 11 before restarting the electric motor controller 4.

The fourth embodiment comprises an electric motor control abnormality detecting device 12, which applies a step current command to the electric motor controller 4 and detects whether there is an abnormality in the control status of the electric motor 1 based on the output signal of a differentiator 13, which detects time differentiation of the rotation phase signal $\phi$. When the electric motor control abnormality detecting device 12 has detected a control abnormality in the electric motor control abnormality detecting device 12, the rotation angle correction device 7 corrects the rotation angle signal φ' by using the rotation angle correction signal Δφ'. Furthermore, the magnetic pole phase correction device 11 can be provided instead of the rotation angle correction device 7, and, as shown by the broken lines of FIG. 4, the magnetic pole phase signal φ output from the magnetic pole phase converter 6 can be corrected by using the magnetic pole phase correction signal Δφ'.

According to the fourth embodiment shown in FIG. 4, the magnetic pole logarithm of the permanent magnet electric motor can be synchronously controlled even when the magnetic pole logarithm of the permanent magnet electric motor is not an integral multiple of the number of repeats of the rotation phase signal during one rotation; in addition, even when the power supply to the control device is cut off, the rotation angle signal and the magnetic pole phase signal can be reliably restored to their values prior to the power cut.

Figure 5:
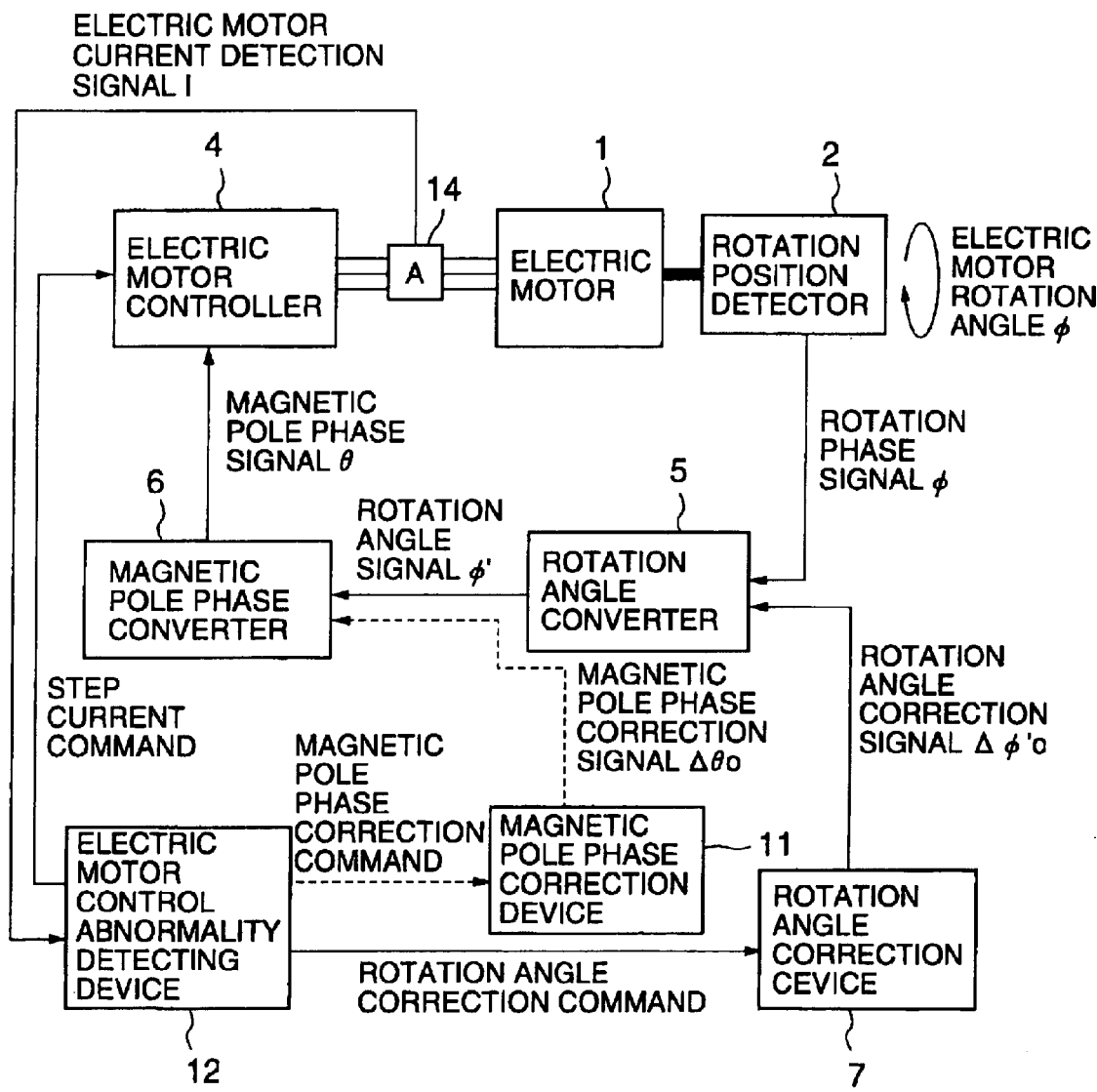
FIG. 5 is a block line diagram showing the constitution of a control device of a permanent magnet electric motor according to a fifth embodiment of this invention.

FIG. 5 is a block line diagram showing the constitution of a control device of a permanent magnet electric motor according to a fifth embodiment of this invention; the same reference codes as those in FIG. 4 represent the same elements, and further explanation of these will be omitted. In the first to third embodiments described above, when the rotation angle signal and magnetic pole phase signal are not accurately corrected at the time of power failure and power restoration, causing the magnetic pole phase to be mistakenly identified, the electric motor will not rotate when the electric motor 1 is driven, resulting in an excessive current flowing to the electric motor controller 4.

Accordingly, in the fifth embodiment, the electric motor control abnormality detecting device 12 captures an output signal from the current detector 14, which detects the current of the electric motor, and, when the value of the output signal has exceeded a reference value, an electric motor control stop command is output to the electric motor controller 4 in addition to the rotation angle correction command. In this case, the rotation angle correction device 7 corrects the rotation angle signal φ' by using the rotation angle correction signal Δφ'.

Furthermore, the magnetic pole phase correction device 11 can be provided instead of the rotation angle correction device 7, and, as shown by the broken lines of FIG. 5, the magnetic pole phase signal φ, which is output from the magnetic pole phase converter 6, can be corrected by using the magnetic pole phase correction signal Δφ'.

After the rotation angle signal φ' and the magnetic pole phase signal θ have been corrected in this manner, the electric motor controller 4 is restarted.

According to the fifth embodiment shown in FIG. 5, the magnetic pole logarithm of the permanent magnet electric motor can be synchronously controlled even when the magnetic pole logarithm of the permanent magnet electric motor is not an integral multiple of the number of repeats of the rotation phase signal during one rotation; in addition, even when the power supply to the control device is cut off, the rotation angle signal and the magnetic pole phase signal can be reliably restored to their values prior to the power cut.

Figure 6:
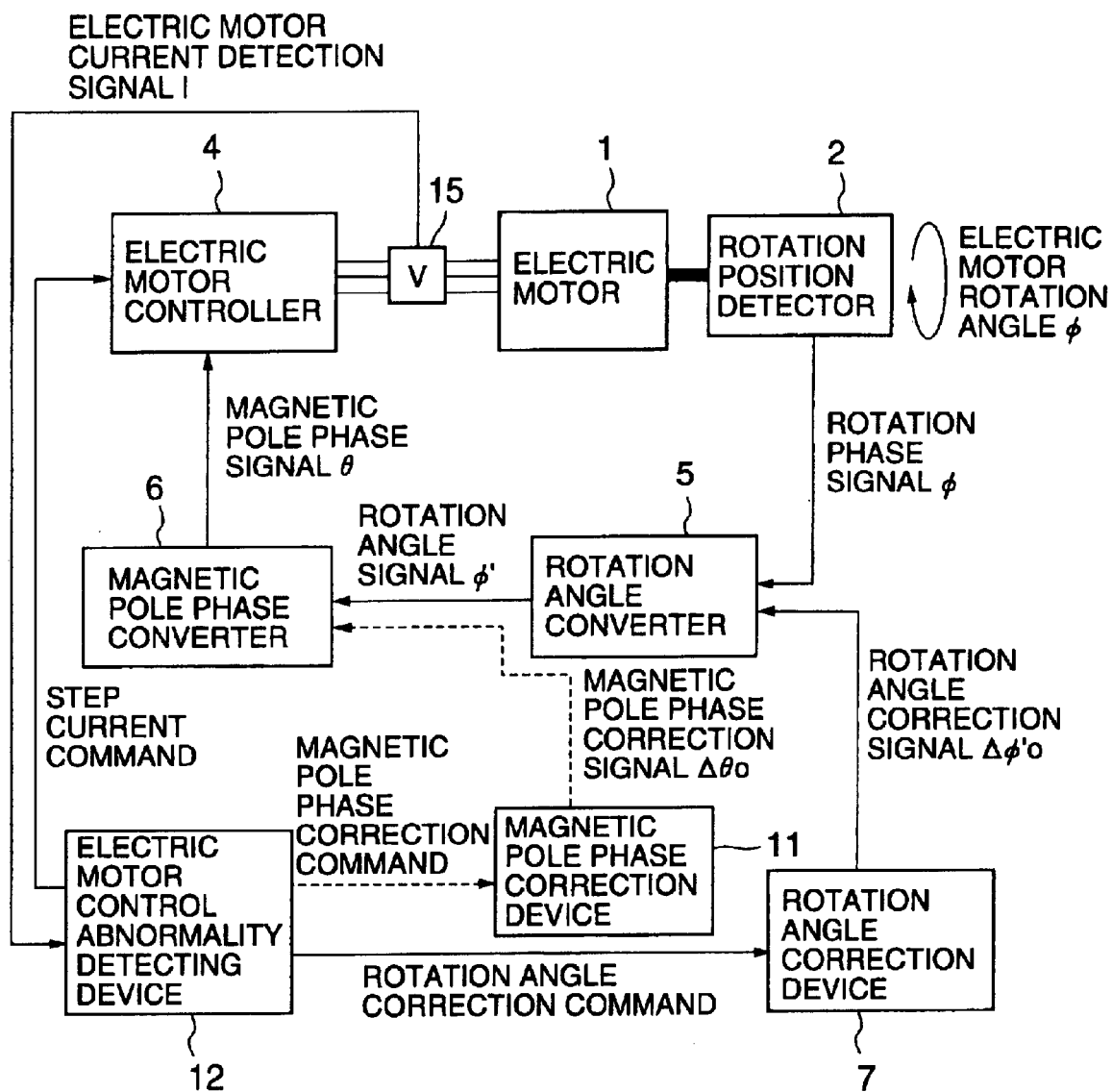
FIG. 6 is a block line diagram showing the constitution of a control device of a permanent magnet electric motor according to a sixth embodiment of this invention.

FIG. 6 is a block line diagram showing the constitution of a control device of a permanent magnet electric motor according to a sixth embodiment of this invention; the same reference codes as those in FIG. 5 represent the same elements, and further explanation of these will be omitted. In the sixth embodiment, a voltage detector 15 is provided instead of the current detector 14 shown in FIG. 5, and, based on the output signal of the voltage detector 15, the electric motor control abnormality detecting device 12 outputs an electric motor control stop command to the electric motor controller 4 in addition to a rotation angle correction signal. Since the operation is otherwise the same as that described using FIG. 5, further explanation will be omitted.

According to the sixth embodiment shown in FIG. 6, the magnetic pole logarithm of the permanent magnet electric motor can be synchronously controlled even when the magnetic pole logarithm of the permanent magnet electric motor is not an integral multiple of the number of repeats of the rotation phase signal during one rotation; in addition, even when the power supply to the control device is cut off, the rotation angle signal and the magnetic pole phase signal can be reliably restored to their values prior to the power cut.

As is clear from the above explanation, this invention provides a control device of a permanent magnet electric motor which can synchronously control the permanent magnet electric motor even when the magnetic pole logarithm of the permanent magnet electric motor is not an integral multiple of the number of repeats of the rotation phase signal during one rotation.

Further, even when the power supply to the control device is cut off, the rotation angle signal and the magnetic pole phase signal can be reliably restored to their values prior to the power cut.

What is claimed is:

1. A control device of a permanent magnet electric motor which creates a magnetic pole phase signal based on a rotation phase signal, obtained by detecting the rotation of an output axis of the permanent magnet electric motor, and synchronously controls the permanent magnet electric motor in compliance with the magnetic pole phase signal, the control device comprising:

a first signal conversion unit which converts the rotation phase signal to a rotation angle signal which is proportional to the rotation angle each time a rotor of the permanent magnet electric motor rotates once; and a second signal conversion unit which converts the rotation angle signal to the magnetic pole phase signal, repeated a number of times equal to a magnetic pole logarithm of the permanent magnet electric motor.

2. The control device of the permanent magnet electric motor as described in claim 1, the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result;

a rotation angle signal memory unit comprising a nonvolatile memory device which constantly stores and updates the output signal of the rotation angle conversion unit in the nonvolatile memory device; and a rotation angle correction unit which, based on the stored value of the rotation angle memory unit, determines a state where the rotation angle signal is different when the power supply to the control device and when the power is restored, creates the rotation angle correction signal and corrects the output of the rotation angle conversion unit, so as to make the rotation angle signal the same when the power supply to the control device and when the power is restored.

3. The control device of the permanent magnet electric motor as described in claim 1, the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal;

a magnetic pole phase memory unit comprising a nonvolatile memory device which constantly stores and updates the output signal of the magnetic pole phase conversion unit in the nonvolatile memory device; and a magnetic pole phase correction unit which, based on the stored value of the magnetic pole phase memory unit, determines a state where the magnetic pole phase signal is different when the power supply to the control device and when the power is restored, creates the magnetic pole phase correction signal and corrects the output of the magnetic pole phase conversion unit, so as to make the magnetic pole phase signal the same when the power supply to the control device and when the power is restored.

4. The control device of the permanent magnet electric motor as described in claim 1, further comprising a magnetic pole determination control unit which determines whether the rotation angle signal should be corrected by measuring a current step response of the permanent magnet electric motor, such as changing phase and creating a magnetic field;

the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; and a rotation angle correction unit which, when the magnetic pole determination control unit has determined that the rotation angle signal should be corrected, creates the rotation angle correction signal and corrects the output of the rotation angle conversion unit, so as to make the rotation angle signal the same when the power supply to the control device and when the power is restored.

5. The control device of the permanent magnet electric motor as described in claim 1, further comprising a magnetic pole determination control unit which determines whether the rotation angle signal should be corrected by measuring a current step response of the permanent magnet electric motor, such as changing phase and creating a magnetic field;

the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal;

a magnetic pole phase correction unit which, when the magnetic pole determination control unit has determined that the magnetic pole phase signal should be corrected, creates the magnetic pole phase correction signal and corrects the output of the magnetic pole phase conversion unit, so as to make the magnetic pole phase signal the same when the power supply to the control device and when the power is restored.

6. The control device of the permanent magnet electric motor as described in claim 1, further comprising a detecting unit which detects speed changes of the permanent magnet electric motor; and an electric motor control abnormality detecting unit which outputs a command to inject step current when the supply power to the control device is restored after failure, and determines whether the rotation angle signal should be corrected when the supply power to the control device is restored after failure, based on the detection result of the detecting unit;

the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; and a rotation angle correction unit which, when the electric motor control abnormality detecting unit has output a rotation angle correction command, creates the rotation angle correction signal and corrects the output of the rotation angle conversion unit, so as to make the rotation angle signal the same when the power supply to the control device and when the power is restored.

7. The control device of the permanent magnet electric motor as described in claim 1, a detecting unit which detects speed changes of the permanent magnet electric motor; and an electric motor control abnormality detecting unit which outputs a command to inject step current when the supply power to the control device is restored after failure, and determines whether the magnetic pole phase signal should be corrected when the supply power to the control device is restored after failure, based on the detection result of the detecting unit;

the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal;

a magnetic pole phase correction unit which, when the electric motor control abnormality detecting unit has determined that the magnetic pole phase signal should be corrected, creates the magnetic pole phase correction signal and corrects the output of the magnetic pole phase conversion unit, so as to make the magnetic pole phase signal the same when the power supply to the control device and when the power is restored.

8. The control device of the permanent magnet electric motor as described in claim 1, further comprising a detecting unit which detects either the current or the voltage of the permanent magnet electric motor;

an electric motor control abnormality detecting unit which, after the power supply to the control device has been resumed after failure, detects a control abnormality of the electric motor based on the detection result of the detecting unit, and outputs an electrical control stop command and a rotation angle correction command;

the first signal conversion unit comprising a rotation angle conversion unit which, when the number of repeats of the rotation phase signal during one rotation of the rotor of the permanent magnet electric motor is n, divides the rotation phase signal by n, adds the rotation angle correction signal to a predetermined segment of the signal thereby obtained, and outputs the result; and a rotation angle correction unit which, when the electric motor control abnormality detecting unit has output a rotation angle correction command, creates the rotation angle correction signal and corrects the output of the rotation angle conversion unit, so as to make the rotation angle signal the same when the power supply to the control device and when the power is restored.

9. The control device of the permanent magnet electric motor as described in claim 1, further comprising a detecting unit which detects either the current or the voltage of the permanent magnet electric motor;

an electric motor control abnormality detecting unit which, after the power supply to the control device has been resumed after failure, detects a control abnormality of the electric motor based on the detection result of the detecting unit, and outputs an electrical control stop command and a rotation angle correction command;

the second signal conversion unit comprising a magnetic pole phase conversion unit which, when the magnetic pole logarithm is m, multiplies the rotation angle signal by m, divides the signal thereby obtained by the rotation angle during one rotation of the rotor of the permanent magnet electric motor and determines the remainder, adds the magnetic pole phase correction signal to a predetermined segment, and outputs this as the magnetic pole phase signal;

a magnetic pole phase correction unit which, when the electric motor control abnormality detecting unit has output a magnetic pole phase signal correction command, creates the magnetic pole phase correction signal and corrects the output of the magnetic pole phase conversion unit, so as to make the magnetic pole phase signal the same when the power supply to the control device and when the power is restored.

* * * * *